United States Patent
Berry et al.

[11] Patent Number: 5,873,419
[45] Date of Patent: Feb. 23, 1999

[54] ICE AUGER ATTACHMENT

[76] Inventors: Donald Dean Berry, Rte. 5, Box 7; Thomas Lee Billberg, 304 7th Ave. Southeast; Charles August Lund, 411 4th Ave. Northeast, all of Roseau, Minn. 56751

[21] Appl. No.: 778,663

[22] Filed: Jan. 3, 1997

[51] Int. Cl.[6] .................................................. F25C 5/04
[52] U.S. Cl. ............................................. 175/18; 299/24
[58] Field of Search ................................. 175/18; 299/24

[56]  References Cited

U.S. PATENT DOCUMENTS

| | | | |
|---|---|---|---|
| 3,299,970 | 1/1967 | Anderson | 175/18 |
| 3,336,989 | 8/1967 | Henderson | 175/18 |
| 3,397,750 | 8/1968 | Wicklund | 175/18 |
| 3,749,184 | 7/1973 | Andeen | 175/18 |
| 3,797,588 | 3/1974 | Gonsson et al. | 175/18 |
| 5,190,113 | 3/1993 | Hawrylak | 299/24 |

FOREIGN PATENT DOCUMENTS 967551  5/1975  Canada ................................. 175/18

*Primary Examiner*—William Neuder
*Attorney, Agent, or Firm*—Merchant, Gould, Smith, Edell, Welter & Schmidt, P.A.

[57]  ABSTRACT

An ice cutting instrument for beveling the ice around the bottom of a hole cut in the ice on a lake, which is driven by a motorized power unit. A vertical power shaft supports a cutting blade which can be adjusted between a position near the shaft to an angled position by a control rod extending along the shaft. The shaft carries one or more spacing devices to center it in the hole. The instrument is inserted in the hole, the blade is extended, and the power unit is then energized to rotate the instrument, which is then pulled upwardly to cut the enlarged opening.

17 Claims, 3 Drawing Sheets

ICE AUGER ATTACHMENT

BACKGROUND OF THE INVENTION

Ice fishing is a popular sport in areas where fresh water lakes freeze over in the winter. Ice is safe to walk on when it reaches 4 or 5 inches in thickness, and in colder climates the ice may reach a depth of 3 feet or more. The fishing is conducted through a hole drilled in the ice ranging from 5 inches to 13 inches in diameter which is cut by either a manually operated or a motorized ice auger. Ice augers powered by a power unit having a gasoline engine are currently popular and are available from many manufacturers.

When a fish is hooked under the ice, it must be pulled up through the hole and, while that is not a problem with smaller fish, many large fish are lost when they must be turned to come up into the hole through which the fishing line extends. The vertical sidewall surface of the hole forms a 90° angle with the bottom of the ice so on most occasions the fish on the hook must make a 90° turn to enter the bottom of the hole. Many large fish are lost at this point because of the extra stress placed on the fishing line and hook when extra pressure is applied to the line to pull the fish around the corner and, in some cases, a sharp edge formed at the bottom of the hole may even cut the line.

SUMMARY OF THE INVENTION

We have discovered that the loss of fish for the reason outlined above can be largely eliminated by enlarging the opening in the ice at the water surface by cutting away the ice around the bottom edge of the hole to form a larger opening with a beveled sidewall gradually diverging away from the vertical walls of the original hole. The enlarged opening, which may extend upwardly from the bottom of the hole six inches or so, still has a circular cross-section but has a truncated, triangular shape in vertical section. If the resulting angle between the surface of the enlarged hole and the bottom of the ice is increased to about 135°, for example, much less effort is required to pull the fish around that corner, thus reducing the likelihood that the line will break or the hook will break loose.

To cut this enlarged opening, we have designed an instrument that can be attached to the power unit of the ice auger. The cutting instrument includes an elongated shaft having an adjustable cutting edge mounted at its bottom end. The instrument is attached to the power unit and lowered into the hole far enough so the cutting edge is below the bottom of the ice. At that time, the cutting edge is extended outwardly by a control linkage to a desired position at an angle with the vertical, at which point the power unit is started, the power is increased and upward pressure is applied causing the cutting edge to engage the ice at the bottom of the hole and gradually cut the larger opening.

These and other features of the invention will be described more fully in the following specification and drawings.

DESCRIPTION OF THE PREFERRED EMBODIMENT

Figure 1:
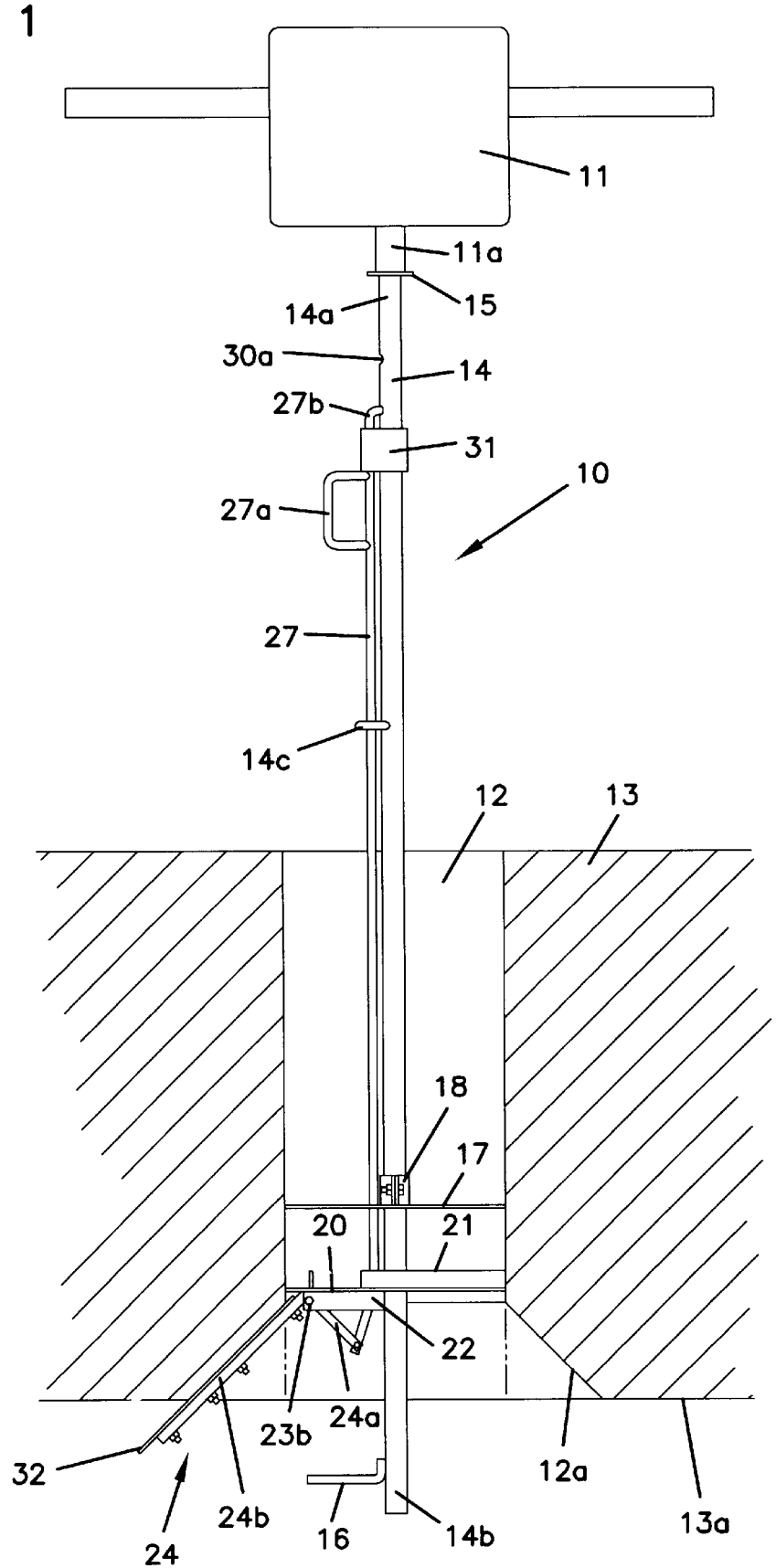
FIG. 1 is a view in side elevation of the ice auger attachment attached to a power unit, shown positioned in a hole in the ice, the ice being shown in section.

Referring now to the drawings, wherein like elements of the invention are identified by like numerals, an ice auger attachment 10 is shown attached to a power unit 11. In FIG. 1, attachment 10 is positioned in a hole 12 drilled in the ice 13. When originally drilled, hole 12 has a circular cross-section and extends vertically through the ice so that the inner surface of the hole 12 forms a 90° angle with the top surface of the ice 13 and also with the bottom surface of the ice 13, as shown in dash lines at the bottom.

A control shaft 14, which in the preferred embodiment is a one inch steel pipe, 48 inches long, is attached at its upper end to the power unit 11 and extends vertically through the hole 12 at its center. Control shaft 14 at its top end 14a has a metal ring 15 welded thereto to form a stop against which the drive socket 11a of the power unit rests. Near its bottom end 14b, an L-shaped stop member 16 is attached by welding or the like to extend perpendicular to the control shaft 14.

A first spacing device, comprising a circular disk 17, having a central opening with a band clamp 18 attached at one end to the disk around the opening, is positioned on control shaft 14 with the shaft extending through clamp 18 and the center opening in disk 17. Disk 17 is clamped to shaft 14 at a location spaced from bottom end 14b so that it will be positioned within the central area of opening 12 in ice 13 to assist in centering and stabilizing the ice auger attachment 10 in the hole 12.

A second spacing device, comprising a circular disk 20 having a central opening through which shaft 14 extends is permanently welded to the shaft at the central opening at a selected position between disk 17 and stop member 16. Disk 20 preferably has the same diameter as disk 17 to again engage the sidewalls of the hole 12 to provide additional stability. Disk 20 is positioned in a horizontal plane in hole 12 and is provided with an upwardly extending rim member 21 on its upper surface adjacent its edge to strengthen the disk and to provide an enlarged surface area for engaging the ice opposite the cutting blade.

Figure 2:
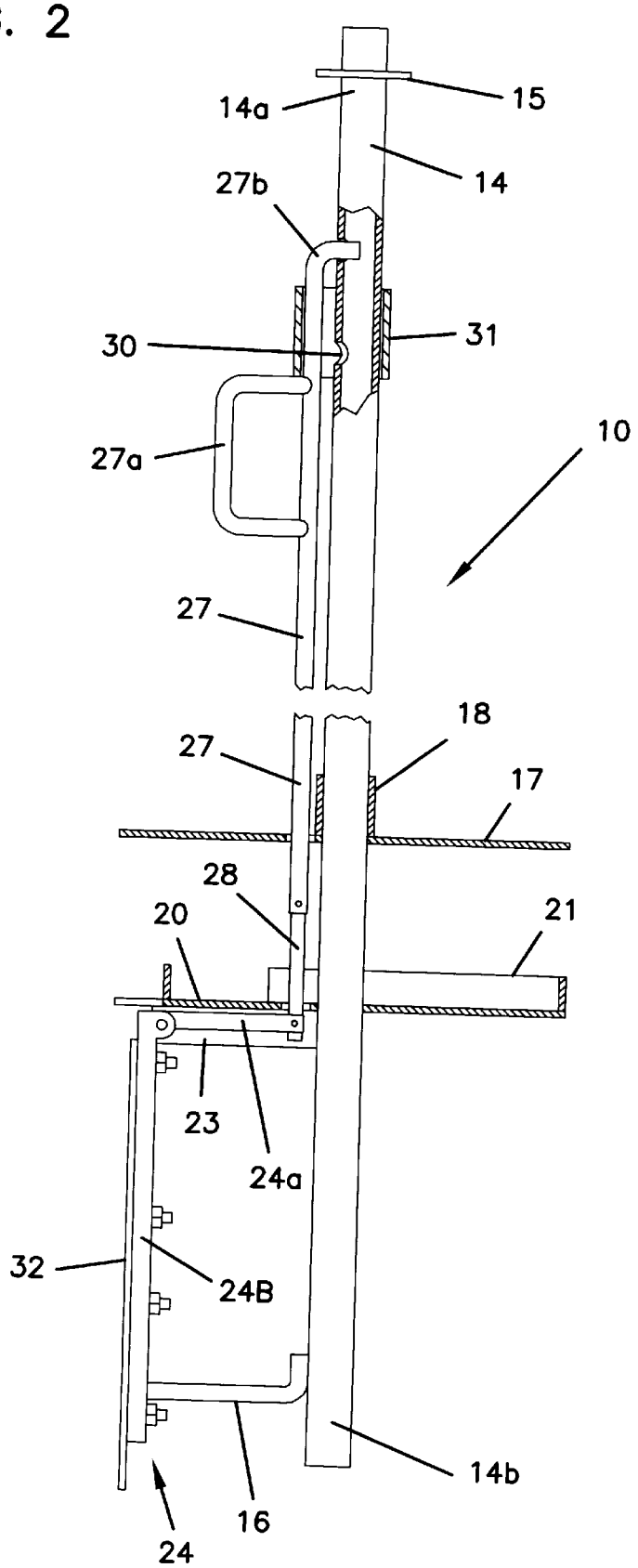
FIG. 2 is a fragmentary, enlarged view in side elevation of the instrument, with portions being shown in section, and with the cutting edge shown in a resting position.
Figure 3:
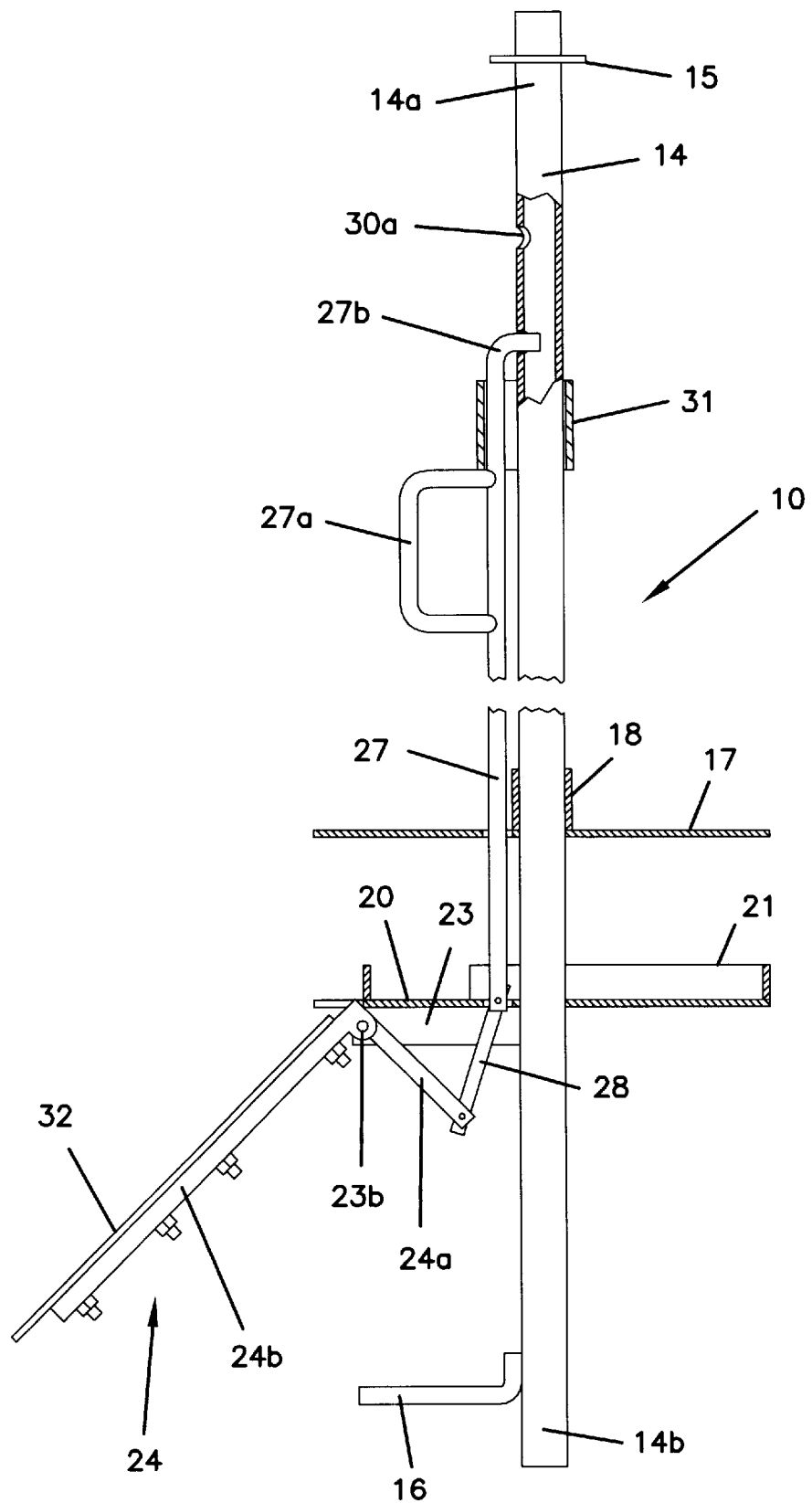
FIG. 3 is a view similar to that shown in FIG. 2, with the cutting edge shown in an operative position.

Attached to the bottom surface of plate 20 and extending radially outwardly from shaft 14 are a pair of spaced support bracket members 22, 23 which extend to a position near the edge of disk 20 and are provided at their outer ends with aligned openings through which a pivot pin 23b extends. An L-shaped member 24 having a control arm portion 24a connected to a support portion 24b at a pivot point is pivotally mounted to support bracket members 22, 23 at pivot pin 23b. Control arm portion 24a extends toward shaft 14 and support portion 24b extends outwardly and downwardly, generally toward stop member 16. As shown in FIGS. 2 and 3, L-shaped member 24 can be pivoted from a position with support portion 24b parallel to shaft 14 and engaging or resting against stop member 16 to a position outwardly therefrom forming an angle with shaft 14, as shown in FIG. 3. As best shown in FIG. 2, support bracket members 22, 23 and stop member 16 are about the same length and are constructed and arranged so that when the support portion 24b of L-shaped member 24 is resting against stop member 16, it is located within a diameter smaller than the diameter of hole 12 so that the ice auger attachment 10 can be easily inserted into the hole.

A control linkage extends along the shaft to permit an operator to move the L-shaped member between its two positions. The control linkage includes a control rod 27, which in the preferred embodiment is a 3/8 inch steel rod, 36 inches long, extending along shaft 14 through openings in disks 17 and 20 and pivotally connected at one end to a link 28 pivotally connected at its other end to the free end of control arm portion 24a. The upper portion of control rod 27 is held in position and guided by a U-shaped metal bracket 14c welded at its ends to shaft 14. Control rod 27 is also provided at its upper end with an elongated generally U-shaped handle 27a welded at its ends to rod 27. The upper end 27b of rod 27 is bent at a 90° angle and is, thus, shaped to have that end portion engageable with a selected one of a plurality of openings or holes 30, 30a in shaft 14. End portion 27b can be inserted into one of the openings 30, 30a to prevent axial movement of control rod 27 with respect to shaft 14. A collar member 31 is moveable on shaft 14 between ring 15 and handle 27a, and has an inner diameter such that when placed over rod 27 as shown in FIG. 1 it will hold end portion 27b in a selected one of the openings 30, 30a in shaft 14.

A cutting blade 32 is mounted on support portion 24b and has a cutting edge facing away from support portion 24b and shaft 14. In the preferred embodiment, the cutting edge is approximately 10 inches in length and the cutting blade is made of 1/8 by 1½ inch cold roll steel material having a plurality of bolts welded thereto which extend through openings in control arm portion 24b so that threaded nuts can be used to attach cutting blade 32 to L-shaped member 24. The cutting blade can thus be easily removed to permit sharpening or replacement of the blade. The mounting bolt holes for the cutting blade are positioned so that the cutting blade can be turned (rotated end for end). The reason for this change is that one manufacturer's power unit turns in one direction and another manufacturer's unit may turn in the opposite direction. The rotation of the cutting blade allows the cutting edge to engage the ice for either clockwise or counter-clockwise rotation of individual power units.

In the embodiment shown, control shaft 14 has two openings 30, 30a. Axial movement of control rod 27 from its engagement with opening 30a as shown in FIG. 2, to its engagement with opening 30 as shown in FIG. 3, causes the link 28 to push control arm portion 24a downwardly and, thus, rotate L-shaped member 24 to swing support portion 24b outwardly to the position shown in FIG. 3 so that a line extending through support portion 24b to intersect control shaft 14 would form an angle of approximately 45° therewith. With the apparatus locked in the position shown in FIG. 3, the entire unit can be pulled upwardly. With the power unit 11 operating, the entire ice auger attachment 10 will rotate rapidly to, thus, rotate cutting blade 32 around an axis formed by shaft 14 to engage the ice around the bottom edge of the hole and gradually cut it away to form a larger opening at the bottom end of opening 12 with sides diverging downwardly and outwardly away from the walls of the original opening to form an enlarged opening with a generally truncated, triangular shaped vertical cross-section, as shown in FIG. 1. With the cutting blade positioned as shown, the angle between the new sidewall portion 12a cut by the blade and the bottom surface 13a of the ice 13 is approximately 135°. After the opening has been formed, the control rod 27 is, again, moved upwardly to return the cutting blade to the position shown in FIG. 2, at which point the unit can be removed from the opening.

The above specification, examples and data provide a complete description of the structure and use of the invention. Since many embodiments of the invention can be made without departing from the spirit and scope of the invention, the invention resides in the claims hereinafter appended.

We claim:
1. An ice cutting instrument for beveling around a of a hole cut in said ice on a lake, comprising:
 (a) an elongated control shaft having a first end for attachment to means for rotating the instrument, and a stop member at a second end;
 (b) at least one spacing device attached to the shaft to keep the shaft centered in the hole;
 (c) a support bracket mounted on said shaft between said stop member and said spacing device;
 (d) an L-shaped member having a control arm portion connected to a support portion at a pivot point pivotally mounted to said support bracket with said control arm portion extending toward said shaft and said support portion extended toward said stop member;
 (e) a control rod extending along said shaft and pivotally connected at one end to a link pivotally connected to a free end of said control arm portion such that movement of said control rod between first and second positions along said shaft pivots said L-shaped member to move said support portion from a position parallel to said shaft and engaging said stop member to a position outwardly therefrom;
 (f) said control shaft having a series of spaced openings adjacent said first end and said control rod being shaped to have an end portion engaged with a selected one of said openings to prevent axial movement thereof with respect to said shaft, and means moveable on said shaft to hold the rod in a selected opening; and
 (g) a cutting blade mounted on said support portion having a cutting edge facing away from said support portion and shaft whereby with said attachment positioned in a hole drilled in the ice on said lake with said spacing device positioned in said hole, said control rod can be positioned to extend the cutting blade outwardly so that upon rotation of the shaft the cutting blade will engage the ice around the bottom of the hole to cut a beveled, gradually enlarging opening around the hole at its bottom end.

2. An ice cutting instrument according to claim 1 wherein two generally circular, spaced disks attached to the shaft act as said spacing devices.

3. An ice cutting instrument according to claim 1 wherein said control rod has an L-shaped end portion for engaging said openings in said shaft.

4. An ice cutting instrument according to claim 3 wherein said control rod has a handle attached thereto adjacent said L-shaped end portion.

5. An ice cutting instrument according to claim 4 wherein said means movable on said shaft is a collar constructed and arranged to hold the rod in a selected opening when positioned over said rod.

6. An ice cutting instrument according to claim 1 wherein said cutting blade is removable, and mounting bolt holes for said cutting blade are positioned so that the cutting blade can be rotated end for end.

7. An ice cutting instrument for beveling around a of a hole cut in said ice on a frozen body of water, comprising:
 (a) an elongated control shaft having a first end for attachment to means for rotating the instrument, and at least one spacing device for engaging the sides of the hole to keep the shaft positioned at a desired location in the hole;
 (b) a support bracket mounted on said shaft;
 (c) a support member pivotally mounted to said support bracket at a pivot point spaced from said shaft;

(d) a control rod extending along said shaft connected at one end to a linkage connected to said support member such that movement of said control rod between first and second positions along said shaft pivots said support member from a position generally parallel to said shaft to a position outwardly therefrom;

(e) said control rod being shaped to have an end portion engageable with a selected one of spaced openings in said control shaft to prevent axial movement thereof with respect to said shaft; and (f) a cutting blade mounted on said support member having a cutting edge facing away from said shaft whereby with said attachment positioned in a hole drilled in the ice with said spacing device positioned in the hole, said control rod can be positioned to extend the cutting blade outwardly so that upon rotation of the shaft the cutting blade will engage the ice around the bottom of the hole to cut an enlarged opening around the hole at its bottom end.

8. An ice cutting instrument according to claim 7 wherein said support member comprises an L-shaped member having a control arm portion connected to a support portion at said pivot point and wherein said linkage is connected to a free end of said control arm portion.

9. An ice cutting instrument according to claim 8 wherein said cutting blade is removably mounted on said support portion.

10. An ice cutting instrument according to claim 7 including means for holding the rod in a selected opening.

11. An ice cutting instrument according to claim 10 wherein said means for holding the rod is a collar axially movable on said shaft sized to hold said control rod end portion in a selected one of said openings when moved over said end portion.

12. An apparatus for cutting an enlarged opening around a bottom end of a hole cut in ice on a frozen body of water, comprising;

(a) a control shaft having a first end adapted to be attached to a power unit for rotating the shaft;

(b) means pivotally mounting a support member to said control shaft;

(c) a control linkage extending along said shaft connected at one end to said support member such that movement of said control linkage along said shaft pivots said support member from a position close to said shaft to a position outwardly therefrom;

(d) said control linkage including a control rod to hold said support member in a selected one of said positions;

(e) a cutting blade mounted on said support member having a cutting edge facing away from said shaft; and (f) said control rod being shaped to have an end portion engageable with a selected one of spaced openings in said control shaft to prevent axial movement thereof with respect to said shaft.

13. An apparatus according to claim 12, comprising:

(a) said control shaft having a stop member at a second end, and at least one spacing device for engaging sides of the hole;

(b) a support bracket mounted on said shaft between said stop member and said spacing device;

(c) said support member comprising an L-shaped member having a control arm portion connected to a support portion at a pivot point pivotally mounted to said support bracket with said control arm portion extending toward said shaft and said support portion extended toward said stop member;

(d) said control linkage comprising a control rod extending along said shaft and pivotally connected at one end to a link pivotally connected to a free end of said control arm portion such that movement of said control rod between first and second positions along said shaft pivots said L-shaped member to move said support portion from a position parallel to said shaft and engaging said stop member to a position outwardly therefrom;

(f) said means for holding said support member in a selected position comprising said control shaft having a series of spaced openings adjacent said first end and said control rod being shaped to have an end portion engaged with a selected one of said openings to prevent axial movement thereof with respect to said shaft, and means moveable on said shaft to hold the rod in a selected opening; and (g) said cutting blade being mounted on said support portion whereby with said apparatus positioned in a hole drilled in the ice with said spacing device positioned in said hole, said control rod can be positioned to extend the cutting blade outwardly so that upon rotation of the shaft the cutting blade will engage the ice around the bottom of the hole to cut a beveled, gradually enlarging opening around the hole at its bottom end.

14. An apparatus according to claim 13 wherein two generally circular, spaced disks attached to the shaft act as said spacing devices.

15. An apparatus according to claim 13 wherein said control rod has an L-shaped end portion for engaging said openings in said shaft.

16. An apparatus according to claim 13 wherein said control rod has a handle attached thereto adjacent said L-shaped end portion.

17. An apparatus according to claim 16 wherein said means movable on said shaft is a collar constructed and arranged to hold the rod in a selected opening when positioned over said rod.

\* \* \* \* \*

UNITED STATES PATENT AND TRADEMARK OFFICE
CERTIFICATE OF CORRECTION

PATENT NO. : 5,873,419

DATED : FEBRUARY 23, 1999

INVENTOR(S) : BERRY ET AL.

It is certified that error appears in the above-identified patent and that said Letters Patent is hereby corrected as shown below:

Col. 4, line 2, claim 1: insert —ice— after "beveling"

Col. 4, line 2, claim 1: insert —bottom end— after "around a"

Col. 4, line 58, claim 7: insert —ice— after "beveling"

Col. 4, line 58, claim 7: insert —bottom end— after "around a"

Signed and Sealed this

Twentieth Day of June, 2000

Attest:

Q. TODD DICKINSON

Attesting Officer        Director of Patents and Trademarks